United States Patent
Hatano et al.

(10) Patent No.: US 12,028,003 B2
(45) Date of Patent: Jul. 2, 2024

(54) TORQUE ESTIMATION METHOD, TORQUE ESTIMATION DEVICE, AND TORQUE ESTIMATION PROGRAM

(71) Applicant: TOYOTA JIDOSHA KABUSHIKI KAISHA, Toyota (JP)

(72) Inventors: Akira Hatano, Toyota (JP); Taro Takahashi, Urayasu (JP); Naoki Mima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 251 days.

(21) Appl. No.: 17/846,172

(22) Filed: Jun. 22, 2022

(65) Prior Publication Data

US 2023/0010384 A1 Jan. 12, 2023

(30) Foreign Application Priority Data

Jul. 9, 2021 (JP) ................. 2021-114553

(51) Int. Cl.
*H02P 21/20* (2016.01)

(52) U.S. Cl.
CPC ................... *H02P 21/20* (2016.02)

(58) Field of Classification Search
CPC . H02P 21/20; H02P 21/50; G05B 2219/4137; G05B 2219/41389; G05B 2219/41394
USPC ....................... 318/400.02, 400.15
See application file for complete search history.

(56) References Cited

U.S. PATENT DOCUMENTS

2020/0108853 A1* 4/2020 Moreillon ............... B62D 7/09

FOREIGN PATENT DOCUMENTS

JP 2009-097896 A 5/2009

OTHER PUBLICATIONS

Endo et al. (WO 2014041726 A1)Vehicle-Mounted Electronic Control Device Date Published Mar. 20, 2014 (Year: 2014).*
Takahashi (JP 2009097896 A) Shaft Torque Measuring Device and Measurement Method of Drive Shaft Date Published May 7, 2009 (Year: 2000).*
Tsubaki (CN 111212778 A) Electric Power Steering Device Date Published May 29, 2020 (Year: 2020).*
Rached Dhaouadi, et al., "A New Dynamic Model of Hysteresis in Harmonic Drives," IEEE Transactions on Industrial Electronics vol. 50, No. 6, Dec. 2003.

* cited by examiner

*Primary Examiner* — Jorge L Carrasquillo
(74) *Attorney, Agent, or Firm* — Oliff PLC

(57) ABSTRACT

A torque estimation method according to the present disclosure estimates a value of shaft torque of a rotary motion transmitting mechanism. The torque estimation method includes: a step of specifying a maximum value of a torsion angle between an input shaft and an output shaft from the time when a measurement value of the torsion angle is zero to the time when the value of the shaft torque is estimated; and a step of specifying the maximum value of the torsion angle. In the step of specifying the maximum value of the torsion angle, the maximum value of the torsion angle is specified based on a difference between the measurement value of the torsion angle subjected to low-pass filter processing at a first cutoff frequency and the measurement value of the torsion angle subjected to low-pass filter processing at a second cutoff frequency.

7 Claims, 6 Drawing Sheets

TORQUE ESTIMATION METHOD, TORQUE ESTIMATION DEVICE, AND TORQUE ESTIMATION PROGRAM

CROSS-REFERENCE TO RELATED APPLICATION

This application claims priority to Japanese Patent Application No. 2021-114553 filed on Jul. 9, 2021, incorporated herein by reference in its entirety.

BACKGROUND

1. Technical Field

The present disclosure relates to a torque estimation method, a torque estimation device, and a torque estimation program

2. Description of Related Art

A torsion angle may be generated between an input shaft and an output shaft of a rotary motion transmitting mechanism such as a transmission. Japanese Unexamined Patent Application Publication No. 2009-97896 discloses a technique of estimating the shaft torque of the rotary motion transmitting mechanism based on the torsion angle.

There is known a phenomenon called "hysteresis", in which the torsion angle between the input shaft and the output shaft does not becomes a value of zero even when the rotary motion transmitting mechanism that is making rotary motion is stopped and the shaft torque becomes a value of zero. According to "A new Dynamic Model of Hysteresis in Harmonic Drives" by Rached Dhaouadi, et al., in IEEE TRANSACTIONS ON INDUSTRIAL ELECTRONICS Vol. 50 Issue 6 published in December 2003, the magnitude of hysteresis depends on the maximum value of the shaft torque from the time when the value of the torsion angle becomes zero to the time when the value of the torsion angle returns to zero again.

Therefore, in the case of estimating the shaft torque from the torsion angle, it is necessary to estimate the magnitude of the hysteresis and estimate the value of the shaft torque in consideration of the estimated magnitude of the hysteresis.

SUMMARY

In the technique disclosed in JP 2009-97896 A, the values of the torsion angle are acquired as data over a long period of time, and the tendency of the torsion angle is analyzed in order to estimate the hysteresis value. However, this method requires the values of the torsion angle to be stored as data over a long period of time, which causes consumption of memory resources.

The present disclosure has been made in order to solve such an issue, and an object of the present disclosure is to provide a torque estimation method, a torque estimation device and a torque estimation program, capable of reducing memory resources necessary for estimation of shaft torque.

A torque estimation method according to one aspect of the present disclosure is a torque estimation method of estimating a value of shaft torque of a rotary motion transmitting mechanism including an input shaft and an output shaft. The torque estimation method includes: a step of specifying a maximum value of a torsion angle between the input shaft and the output shaft from a time point when a measurement value of the torsion angle is zero to a time point when the value of the shaft torque is estimated; and a step of estimating the value of the shaft torque based on the measurement value of the torsion angle at the time point when the value of the shaft torque is estimated and on the maximum value of the torsion angle. In the step of specifying the maximum value of the torsion angle, the maximum value of the torsion angle is specified based on a difference between the measurement value of the torsion angle subjected to low-pass filter processing at a first cutoff frequency and the measurement value of the torsion angle subjected to low-pass filter processing at a second cutoff frequency.

In the torque estimation method according to the one aspect of the present disclosure, first the maximum value of the torsion angle at the time of estimation is specified based on a difference between the measurement value of the torsion angle subjected to low-pass filter processing at a first cutoff frequency and the measurement value of the torsion angle subjected to low-pass filter processing at a second cutoff frequency. The value of shaft torque is then estimated based on the specified maximum value of the torsion angle and the value of the torsion angle at the time of estimation.

Thus, the torque estimation method according to the one aspect of the present disclosure can be executed when at least the maximum value of the torsion angle is stored. Therefore, it is possible to reduce the memory resources necessary to estimate the shaft torque.

In the torque estimation method, in the step of specifying the maximum value of the torsion angle, the difference between the measurement value of the torsion angle subjected to the low-pass filter processing at the first cutoff frequency and the measurement value of the torsion angle subjected to the low-pass filter processing at the second cutoff frequency may be calculated, the time point when negative and positive inversion of the difference in torsion angle occurs may be detected as the time point when the torsion angle take an extreme value, and among the detected extreme values of the torsion angle, the extreme value having a largest absolute value may be specified as the maximum value of the torsion angle.

Thus, the torque estimation method according to the one aspect of the present disclosure can specify the maximum value of the torsion angle when at least the largest extreme value is stored. Therefore, it is possible to reduce the memory resources necessary to estimate the shaft torque.

In the torque estimation method, in the step of estimating the value of the shaft torque, a value of hysteresis of the shaft torque may be estimated from the maximum value of the torsion angle, and the value of the shaft torque may be estimated based on the value of the hysteresis.

Thus, the torque estimation method according to the one aspect of the present disclosure can estimate the value of hysteresis from a single value (the maximum value of the torsion angle). Therefore, it is possible to reduce the memory resources necessary to estimate the shaft torque.

In the torque estimation method, in the step of estimating the value of the shaft torque, the value of the shaft torque may be estimated when rotary motion is stopped.

Since the hysteresis has an influence on the estimation value of the shaft torque when the rotary motion is stopped in particular, the torque estimation method according to the one aspect of the present disclosure is particularly effective in the case of estimating the value of the shaft torque when the rotary motion is stopped.

In the torque estimation method, the torsion angle between the input shaft and the output shaft may be detected by a first sensor attached to the input shaft and a second sensor attached to the output shaft.

A torque estimation device according to one aspect of the present disclosure is a torque estimation device configured to estimate shaft torque of a rotary motion transmitting mechanism including an input shaft and an output shaft. The torque estimation device includes: a first sensor, a second sensor, first and second low-pass filters, and a control unit. The first sensor is attached to the input shaft. The second sensor is attached to the output shaft. The first and second low-pass filters are different in cutoff frequency. The control unit is configured to estimate a value of the shaft torque based on a measurement value of a torsion angle between the input shaft detected by the first sensor and the output shaft detected by the second sensor. The control unit is configured to specify a maximum value of the torsion angle between the input shaft and the output shaft from the time point when the measurement value of the torsion angle is zero to the time point when the value of the shaft torque is estimated based on a difference between the measurement value of the torsion angle subjected to the low-pass filter processing at a first cutoff frequency and the measurement value of the torsion angle subjected to the low-pass filter processing at a second cutoff frequency, and estimate the value of the shaft torque based on the measurement value of the torsion angle at the time point when the value of the shaft torque is estimated and on the maximum value of the torsion angle.

A torque estimation program according to one aspect of the present disclosure is a torque estimation program causing a computer to execute processing to estimate shaft torque of a rotary motion transmitting mechanism including an input shaft and an output shaft. The torque estimation program includes: a step of specifying a maximum value of a torsion angle between the input shaft and the output shaft from the time point when a measurement value of the torsion angle is zero to the time point when the value of the shaft torque is estimated; and a step of estimating the value of the shaft torque based on the measurement value of the torsion angle at the time point when the value of the shaft torque is estimated and on the maximum value of the torsion angle. In the step of specifying the maximum value of the torsion angle, the maximum value of the torsion angle is specified based on a difference between the measurement value of the torsion angle subjected to low-pass filter processing at a first cutoff frequency and the measurement value of the torsion angle subjected to low-pass filter processing at a second cutoff frequency.

The present disclosure can provide the torque estimation method, the torque estimation device and the torque estimation program, capable of reducing memory resources necessary for estimation of shaft torque.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, a specific embodiment to which the present disclosure is applied will be described in detail with reference to the drawings. However, the following embodiment is not intended to limit the present disclosure. For clear understanding, the following descriptions and drawings are simplified as appropriate.

First Embodiment

Description of Hysteresis in Relationship between Torsion Angle and Shaft Torque A torque estimation method according to the present embodiment is to correct error in estimation of shaft torque attributed to hysteresis.

Figure 1:
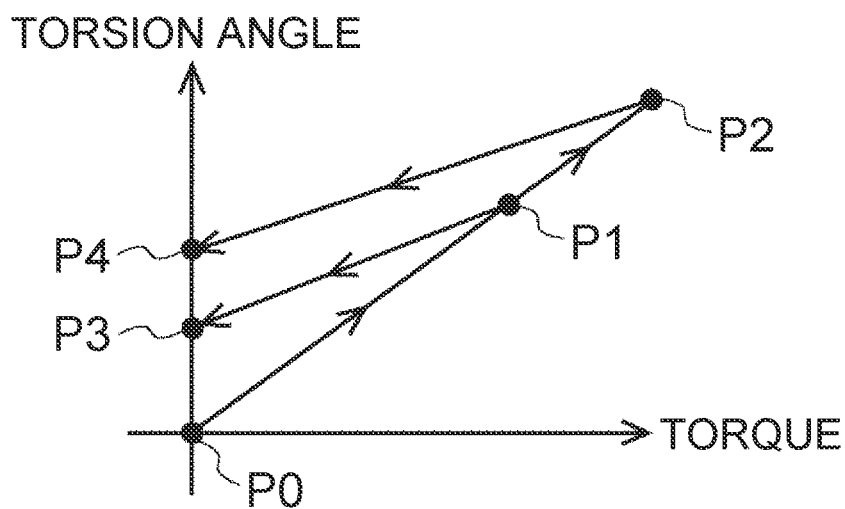
FIG. 1 is a graph showing a magnitude relationship between a torsional angle and shaft torque of a rotary motion transmitting mechanism.
Figure 2:
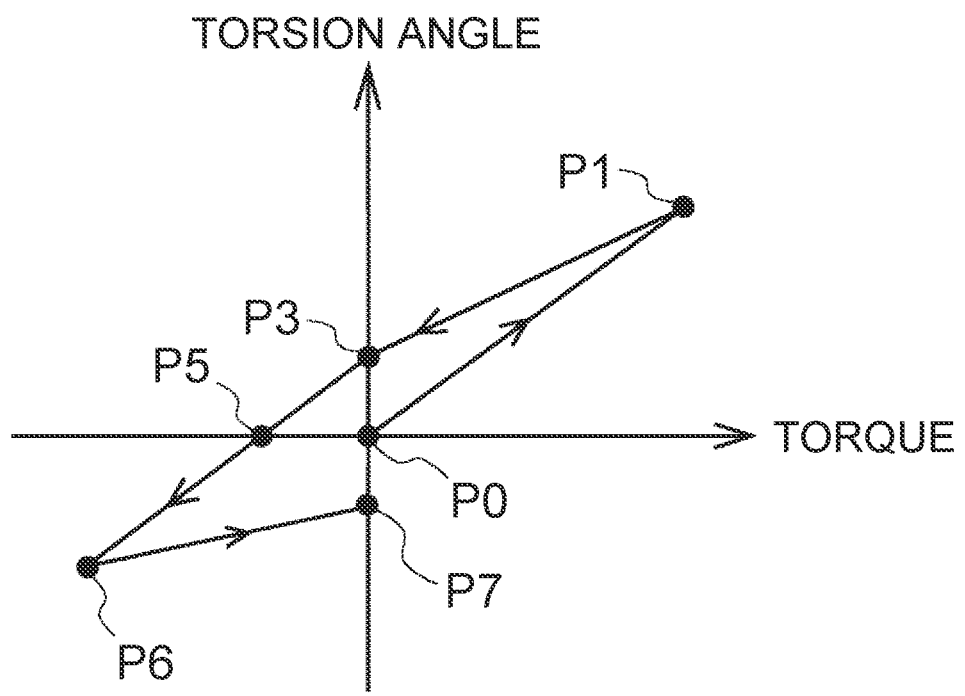
FIG. 2 is a graph showing the magnitude relationship between the torsional angle and the shaft torque of the rotary motion transmitting mechanism.

First, the hysteresis will be described in detail using FIGS. 1 and 2. FIGS. 1 and 2 are graphs showing magnitude relationship between a torsion angle and shaft torque in a rotary motion transmitting mechanism. FIG. 1 illustrates two cases including a case where the shaft torque starts to change from an origin P0, takes a maximum value at a point P1, and returns to zero again, and a case where the shaft torque takes the maximum value at a point P2 and returns to zero again.

In both the cases, the value of the torsion angle is not zero when the shaft torque returns to zero due to hysteresis. The values of the torsion angle are different in the respective cases (points P3, P4). In other words, the values of the torsion angles taken by the points P3, P4 depend on the values of the points P1, P2, i.e., the maximum values of the shaft torque, respectively.

FIG. 2 illustrates the shaft torque that starts at the origin P0, and changes to points P1, P3, P5, P6 in this order until the shaft torque reaches a point P7. As in the case of FIG. 1, when the value of the shaft torque returns to zero through the point P1, the shaft torque reaches the point P3 without returning to the origin P0 due to hysteresis. The value at the point P3 depends on the value of the shaft torque at the point P1 as previously mentioned.

When shaft torque in a reverse direction is applied after the value of the shaft torque reaches the point P3, the value of the torsion angle becomes zero at the point P5. Here, when the value of the shaft torque reaches the point P7 through the point P5 and the point P6, the value of the torsion angle at the point P7 depends only on the value of the shaft torque at the point P6, and does not depend on the value of the shaft torque at the point P1. This means that the maximum value of the shaft torque is reset when the value of the torsion angle becomes zero. In other words, the magnitude of the hysteresis depends on the maximum value of the shaft torque from the time when the value of the torsion angle becomes zero to the time when the value of the torsion angle returns to zero again.

In this specification, the value of the shaft torque refers to the magnitude of the shaft torque, i.e., the absolute value of the shaft torque.

Based on the above discussion, when it is possible to know the maximum value of the shaft torque from the time when the value of the torsion angle becomes zero to the time when the value of the torsion angle returns to zero again, the value of hysteresis can be estimated. Furthermore, the maximum value of the shaft torque can be estimated from the maximum value of the torsion angle. Therefore, when it is possible to know the maximum value of the torsion angle from the time when the value of the torsion angle becomes zero to the time when the value of the torsion angle returns to zero again, the value of hysteresis can be estimated.

Accordingly, in the present embodiment, estimation error of the shaft torque due to hysteresis is corrected by specifying the maximum value of the torsion angle from the time when the value of the torsion angle is zero to the time when the value of the torsion angle returns to zero again.

Configuration of Torque Estimation Device

Figure 3:
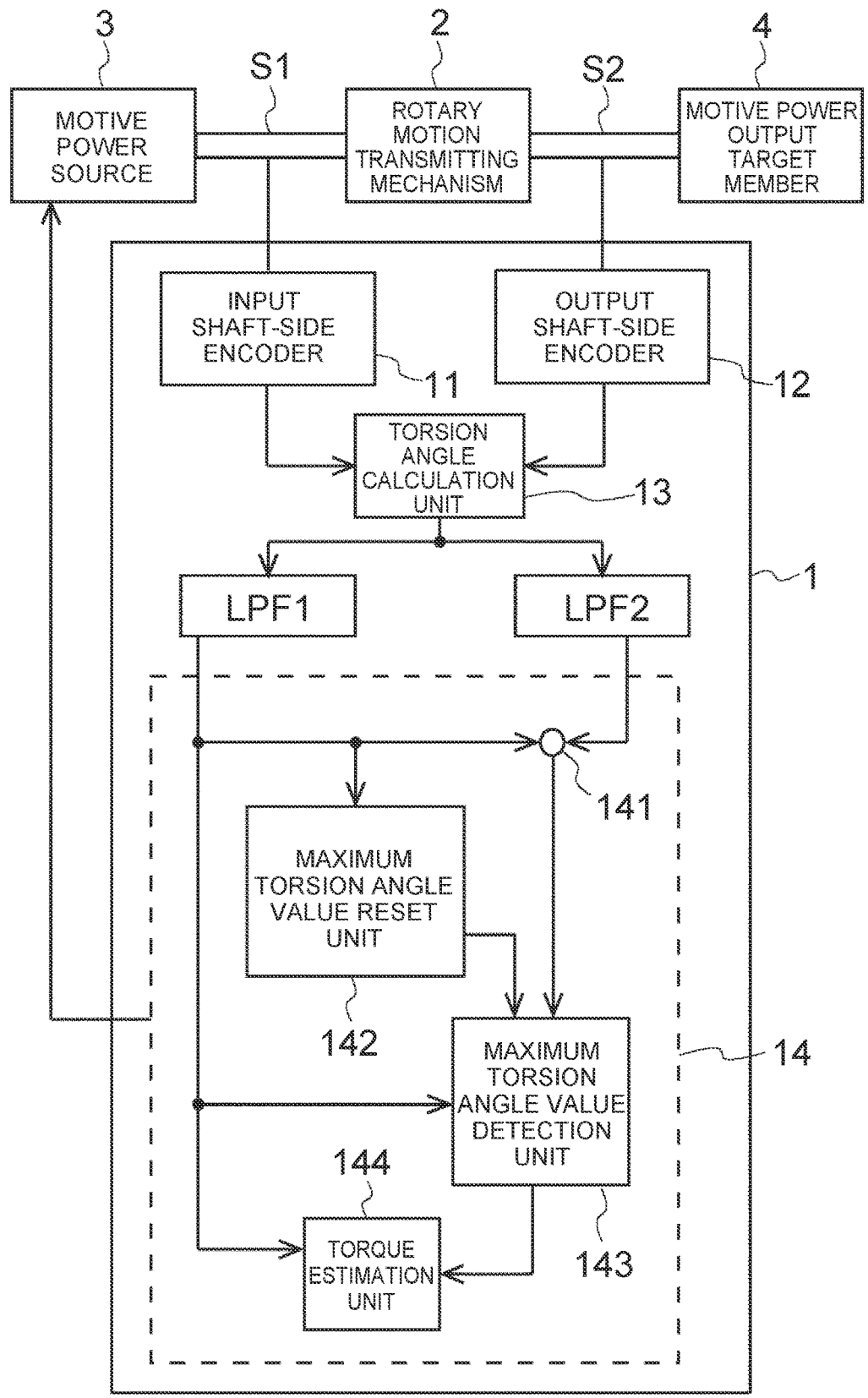
FIG. 3 is a block diagram showing the configuration of a torque estimation device according to a first embodiment.

Description is now given of a torque estimation device according to the first embodiment with reference to FIG. 3. FIG. 3 is a block diagram showing the configuration of the torque estimation device according to the first embodiment. FIG. 3 shows a torque estimation device 1 according to the present embodiment, as well as a rotary motion transmitting mechanism 2, a motive power source 3, and a motive power output target member 4.

For example, the rotary motion transmitting mechanism 2 is a transmission configured to transmit rotary motion output from the motive power source 3 to the motive power output target member 4. The rotary motion transmitting mechanism 2 includes an input shaft S1 and an output shaft S2. The rotary motion transmitting mechanism 2 changes the rotary motion input to the input shaft S1 so as to have an appropriate angular velocity and an appropriate orientation, and outputs the changed rotary motion from the output shaft S2.

The motive power source 3 is a device that can output the rotary motion of an engine, a motor, and the like. The motive power source 3 is coupled to the input shaft S1.

For example, the motive power output target member 4 is a wheel of a mobile object or a link of a robot arm, to which the rotary motion is output. The motive power output target member 4 is coupled to the output shaft S2.

As shown in FIG. 3, the torque estimation device 1 includes an input shaft-side encoder 11, an output shaft-side encoder 12, a torsion angle calculation unit 13, a control unit 14, and low-pass filters LPF1, LPF2.

The input shaft-side encoder 11 is a sensor (first sensor) attached to the input shaft S1 to detect a rotation angle of the input shaft S1. The input shaft-side encoder 11 outputs information on a detected rotation angle of the input shaft S1 to the torsion angle calculation unit 13.

The output shaft-side encoder 12 is a sensor (second sensor) attached to the output shaft S2 to detect a rotation angle of the output shaft S2. The output shaft-side encoder 12 outputs information on a detected rotation angle of the output shaft S2 to the torsion angle calculation unit 13.

The torsion angle calculation unit 13 calculates a torsion angle based on the information on the rotation angle of the input shaft S1 acquired from the input shaft-side encoder 11 and the information on the rotation angle of the output shaft S2 acquired from the output shaft-side encoder 12. Since the torsion angle calculated by the torsion angle calculation unit 13 includes noise, the torsion angle is output to the low-pass filters LPF1, LPF2.

The low-pass filters LPF1, LPF2 have cutoff frequencies different from each other. The low-pass filters LPF1, LPF2 apply low-pass filter processing (hereinafter referred to as LPF processing) at cutoff frequencies different from each other to the torsion angle calculated by the torsion angle calculation unit 13. The low-pass filters LPF1, LPF2 output the torsion angles subjected to the respective LPF processing to the control unit 14.

In the present embodiment, the cutoff frequency of the low-pass filter (the first low-pass filter) LPF1 is smaller than the cutoff frequency of the low-pass filter (the second low-pass filter) LPF2. However, the size relationship of the frequencies can be reversed.

Furthermore, the torsion angle subjected to the LPF processing by the low-pass filter LPF1 is referred to as a torsion angle L, and the torsion angle subjected to LPF processing by the low-pass filter LPF2 is referred to as a torsion angle H.

The control unit 14 acquires a value of the torsion angle L from the low-pass filter LPF1, and a value of the torsion angle H from the low-pass filter LPF2. The control unit 14 estimates a value of the shaft torque acting on the rotary motion transmitting mechanism 2 based on the acquired value of the torsion angle L and the acquired value of the torsion angle H.

Here, the control unit 14 controls the output of the motive power source 3 based on an estimated value of the shaft torque, for example. The control unit 14 can more precisely control the rotary motion based on the estimated value of the shaft torque.

The control unit 14 may perform only the estimation of the value of the shaft torque without controlling the output of the motive power source 3.

More specifically, as shown in FIG. 3, the control unit 14 includes a subtraction unit 141, a maximum torsion angle value reset unit 142, a maximum torsion angle value detection unit 143, and a torque estimation unit 144.

The subtraction unit 141 acquires the torsion angle L and the torsion angle H from the low-pass filters LPF1, LPF2, and calculates a value obtained by subtracting the torsion angle H from the torsion angle L, i.e., a value resulting from (torsion angle L—torsion angle H). The subtraction unit 141 outputs the calculated value of (torsion angle L—torsion angle H) to the maximum torsion angle value detection unit 143.

The maximum torsion angle value reset unit 142 acquires the value of the torsion angle L from the low-pass filter LPF1. The maximum torsion angle value reset unit 142 detects positive and negative inversion of the value of the torsion angle L. When the positive and negative inversion of the torsion angle L is detected, the maximum torsion angle value reset unit 142 notifies the detection to the maximum torsion angle value detection unit 143.

The maximum torsion angle value detection unit 143 acquires the value of (torsion angle L—torsion angle H) from the subtraction unit 141, and detects negative and positive inversion of the value of (torsion angle L—torsion angle H). When the positive and negative inversion of the value of (torsion angle L—torsion angle H) is detected, the maximum torsion angle value detection unit 143 regards the time point of detection as the time point when the torsion angle takes an extreme value, and acquires the value of the torsion angle L at that time point from the low-pass filter LPF1.

When the acquired value of the torsion angle L is larger than the maximum value of the torsion angle L at that time point, the maximum torsion angle value detection unit 143 updates the maximum value of the torsion angle to the acquired value of the torsion angle L. The maximum torsion angle value detection unit 143 outputs the maximum value of the torsion angle L to the torque estimation unit 144.

Note that the reason why the time point of the positive and negative inversion of the value of (torsion angle L—torsion angle H) can be regarded as the time point when the torsion angle takes an extreme value will be described later.

Furthermore, the maximum torsion angle value detection unit 143 resets the maximum value of the torsion angle upon reception of the notification from the maximum torsion angle value reset unit 142. Specifically, the maximum value of the torsion angle is reset to zero.

The torque estimation unit 144 acquires values of the torsion angle L from the low-pass filter LPF1 and the maximum value of the torsion angles from the maximum torsion angle value detection unit 143. The torque estimation unit 144 then estimates a value of the shaft torque of the rotary motion transmitting mechanism 2 based on the value of the torsion angle L and the maximum value of the torsion angle L. Specifically, the torque estimation unit 144 estimates the magnitude of hysteresis from the maximum value of the torsion angle L, and estimates the value of the shaft torque of the rotary motion transmitting mechanism 2 based on the estimated magnitude of hysteresis and the value of the torsion angle L.

Note that the torque estimation unit 144 may estimate the value of the shaft torque based only on the value of the torsion angle L when the rotary motion transmitting mechanism 2 continues to make a rotary motion. When the rotary motion transmitting mechanism 2 stops the rotary motion, the torque estimation unit 144 may estimate the value of the shaft torque based on the value of the torsion angle L and the maximum value of the torsion angle L.

The control unit 14 also includes an arithmetic unit such as a central processing unit (CPU), and a storage unit such as a random access memory (RAM) and a read only memory (ROM) that store a program and data for estimating the value of the shaft torque, which are not illustrated. In short, the control unit 14 has a function as a computer that estimates the value of the shaft torque based on the program.

Therefore, each function block constituting the control unit 14 shown in FIG. 1 may be configured from the CPU, the storage unit, and other circuits in the manner of hardware, and may be implemented by the program, or the like, that estimates the value of the shaft torque stored in the storage unit in the manner of software. In other words, the control unit 14 can be implemented in various aspects by hardware, software, or a combination of both.

Torque Estimation Method

Figure 4:
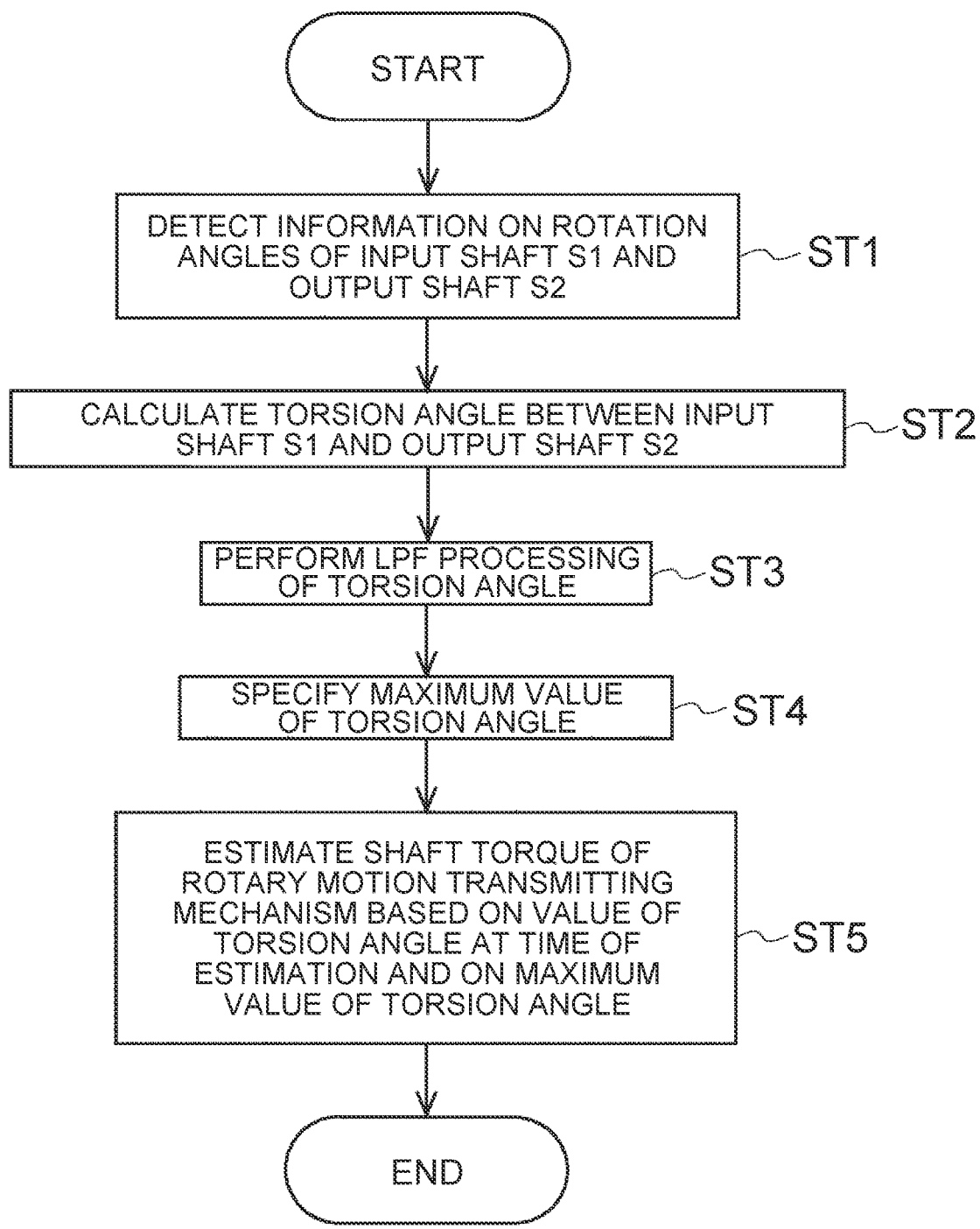
FIG. 4 is a flowchart showing the processing of a torque estimation method according to the first embodiment.

Now, detailed description is given of the processing performed by the torque estimation device 1 to estimate a value of shaft torque acting on the rotary motion transmitting mechanism 2, i.e., the torque estimation method according to the present embodiment, with reference to FIG. 4. FIG. 4 is a flowchart showing the processing of the torque estimation method according to the first embodiment. In the description of FIG. 4, FIG. 3 is referred as appropriate.

First, as shown in FIG. 4, in the torque estimation device 1, the input shaft-side encoder 11 detects information on a rotation angle of the input shaft S1, and the output shaft-side encoder 12 detects information on a rotation angle of the output shaft S2 (step ST1).

The torsion angle calculation unit 13 then calculates a torsion angle between the input shaft S1 and the output shaft S2 based on the information on the rotation angle of the input shaft S1 detected by the input shaft-side encoder 11 and the information on the rotation angle of the output shaft S2 detected by the output shaft-side encoder 12 (step ST2).

Since the calculated torsion angle contains noise, the low-pass filter LPF1 performs LPF processing to remove the noise (step ST3). Here, the low-pass filter LPF2 may perform the LPF processing.

Next, the control unit 14 specifies the maximum value of the torsion angle between the input shaft S1 and the output shaft S2 from the time point when the value of the torsion angle is zero to the time point when the value of the shaft torque is estimated (step ST4).

Finally, the control unit 14 estimates the value of the shaft torque of the rotary motion transmitting mechanism 2 based on the measurement value of the torsion angle at the time point when the value of the shaft torque is estimated and on the maximum value of the torsion angle specified in step ST4 (step ST5). Specifically, the control unit 14 estimates the magnitude of hysteresis from the maximum value of the torsion angle estimated in step ST4, and estimates the value of the shaft torque based on the estimated magnitude of hysteresis.

Hysteresis has a significant influence on the estimation value of the shaft torque especially when the rotary motion is stopped. Therefore, the torque estimation device 1 according to the present embodiment may estimate the shaft torque by the processing as shown in FIG. 4 in the case of estimating the value of the shaft torque when the rotary motion is stopped in particular. The torque estimation device 1 may also be configured to calculate the shaft torque without considering the value of hysteresis when the rotary motion is continuously made. For example, the torque estimation device 1 may calculate the shaft torque by multiplying the torsion angle by a specific spring constant. Such configuration can simplify the processing necessary for estimation of the shaft torque.

Figure 5:
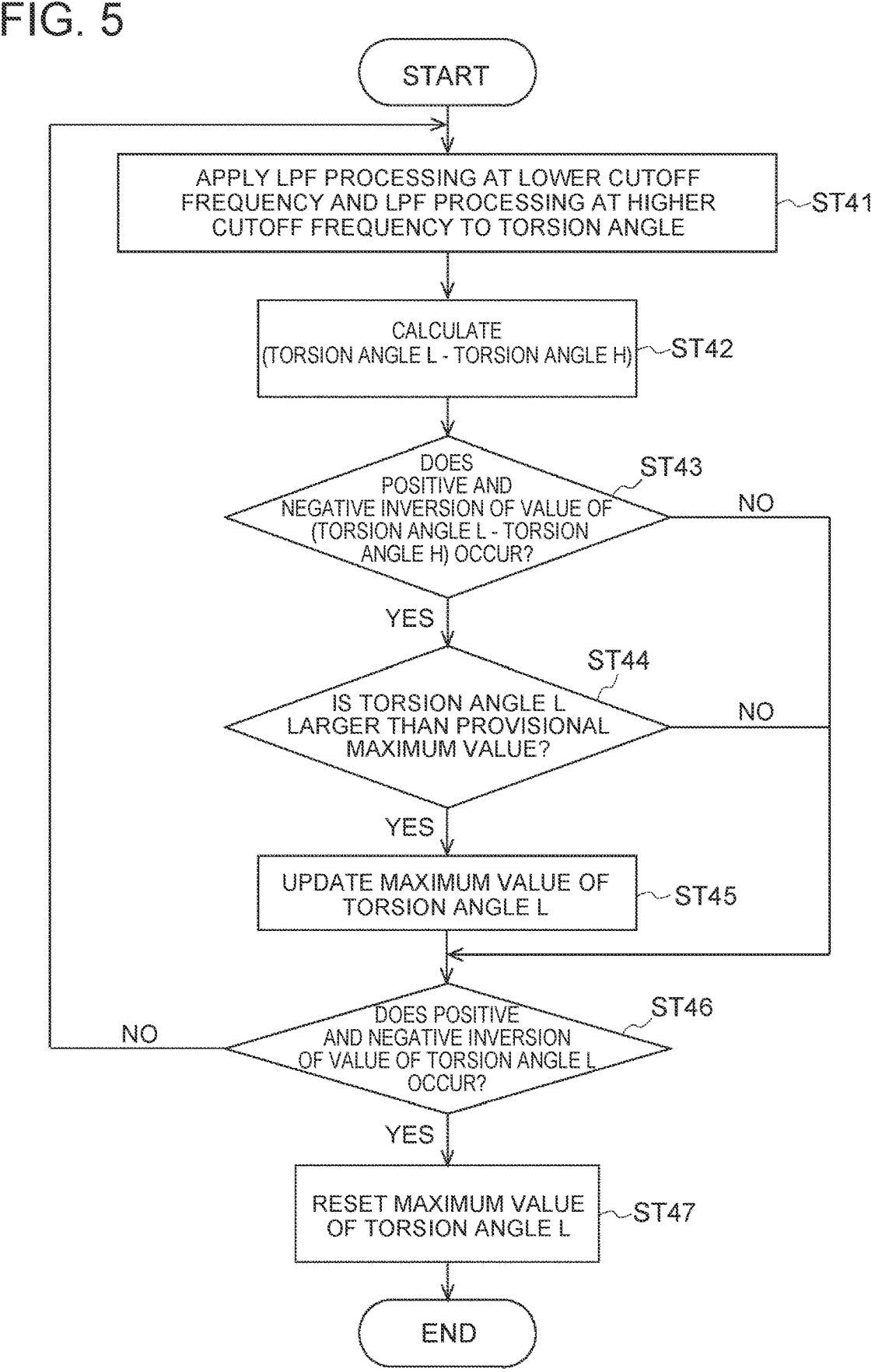
FIG. 5 is a flowchart illustrating the processing of a step of specifying the maximum value of a torsion angle.

Hereinafter, more detailed description is given of the processing in the step of specifying the maximum value of the torsion angle (step ST4 in FIG. 4) with reference to FIG. 5. FIG. 5 is a flowchart illustrating the processing in the step of specifying the maximum value of the torsion angle. The torque estimation device 1 according to the present embodiment specifies the maximum value of the torsion angle based on a difference between a measurement value of the torsion angle subjected to LPF processing at a first cutoff frequency and a measurement value of the torsion angle subjected to LPF processing at a second cutoff frequency.

First, the control unit 14 applies LPF processing at a lower cutoff frequency (hereinafter referred to as "lower LPF processing") and LPF processing at a higher cutoff frequency (hereinafter referred to as "higher LPF processing") to the torsion angle that is calculated by the torsion angle calculation unit 13 in step ST2 of FIG. 4, and outputs a torsion angle L and a torsion angle H are output (step ST41). Specifically, the lower LPF processing is LPF processing by the low-pass filter LPF1, and the higher LPF processing is LPF processing by the low-pass filter LPF2.

Note that the torsion angle subjected to LPF processing in step ST3 in FIG. 3 may be used as one of the torsion angle L and the torsion angle H. In the present embodiment, the torsion angle subjected to LPF processing in step ST3 in FIG. 3 is used as the torsion angle L.

Then, the subtraction unit 141 performs processing of subtracting the value of the torsion angle H from the value of the torsion angle L. In short, the subtraction unit 141 calculates the value of (torsion angle L—torsion angle H) (step ST42). Here, the value of the torsion angle L may be subtracted from the value of the torsion angle H.

Next, the maximum torsion angle value detection unit 143 determines whether or not positive and negative inversion of the value of (torsion angle L—torsion angle H) obtained in step ST42 occurs (step ST43).

Figure 6:
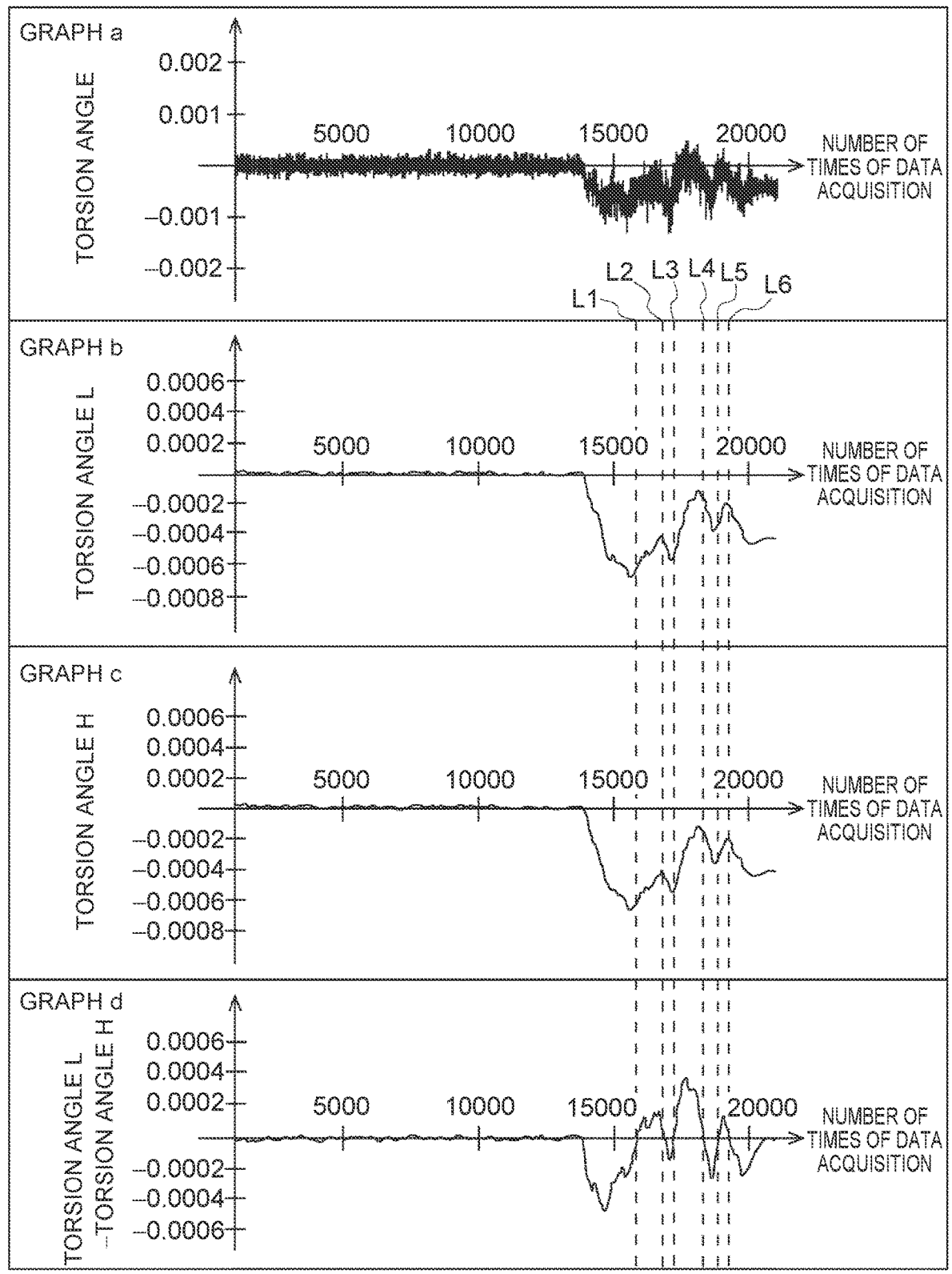
FIG. 6 shows graphs illustrating the processing of the torque estimation method according to the first embodiment.

FIG. 6 shows graphs illustrating actual examples of the processing corresponding to steps ST41 to ST43 in FIG. 5. The horizontal shaft in the four graphs shown in FIG. 6 represents the number of times that the torque estimation device 1 acquires data, which substantially represent time. The four graphs are also depicted with the horizontal shaft values being aligned. Graphs a to d in FIG. 6 have a value of the torsion angle before being subjected to LPF processing, a value of the torsion angle L, a value of the torsion angle H, and a value of (torsion angle L—torsion angle H) as their vertical axes, respectively.

In the graphs, all the measured values of the torsion angle are displayed. However, the measured values are displayed for the sake of easy understanding, and it does not indicate that the torque estimation device 1 simultaneously stores all the values of the torsion angle displayed in the graphs.

As described above, the maximum torsion angle value detection unit 143 detects the time point when the positive and negative inversion of the value of (torsion angle L—torsion angle H) occurs as the time point when the torsion angle takes an extreme value. Therefore, attention is paid to the time point when the positive and negative inversion occurs in the graph d in FIG. 6. Lines L1 to L6 all include the time points when positive and negative inversion occurs in the graph d in FIG. 6. The lines L1 to L6 are lines perpendicular to the horizontal axis. As indicated by the lines L1 to L6 and the graphs b, c, it is clear that the lines L1 to L6 extend in the proximity of the time points when the torsion angle L and the torsion angle H take an extreme value.

The flowchart of FIG. 5 will be discussed again.

When the positive and negative inversion of the value of (torsion angle L—torsion angle H) does not occur (NO in step ST43), the processing shifts to step ST46 described later.

On the other hand, when the positive and negative inversion of the value of (torsion angle L—torsion angle H) occurs (YES in step ST43), the maximum torsion angle value detection unit 143 determines the value of the torsion angle L at that time point as a newly detected extreme value of the torsion angle L. Then, the maximum torsion angle value detection unit 143 determines whether or not the newly detected extreme value of the torsion angle L is larger than the maximum value of the torsion angle L at that time point (step ST44).

When the extreme value of the newly detected extreme value of the torsion angle L is larger than the maximum value of the torsion angle L at the time point (YES in step ST44), the maximum torsion angle value detection unit 143 updates the maximum value of the torsion angle L to the newly detected extreme value of the torsion angle L (step ST45). The processing then shifts to step ST46.

On the other hand, when the extreme value of the newly detected extreme value of the torsion angle L is smaller than the maximum value of the torsion angle L at that time point (NO in step ST44), the maximum torsion angle value reset unit 142 determines whether or not the positive and negative inversion of the value of the torsion angle L occurs without updating the maximum value of the torsion angle L (step ST46).

When the positive and negative inversion occurs (YES in step ST46), the maximum torsion angle value reset unit 142 determines that there is a time point when the value of the torsion angle L is zero and resets the maximum value of the torsion angle L (step ST47). Then, the processing is ended as it is.

On the other hand, when the positive and negative inversion does not occur (NO in step ST46), the maximum torsion angle value reset unit 142 does not reset the maximum value of the torsion angle L, and the processing returns to step ST41. In other words, the steps ST41 to ST46 are repeated until the maximum value of the torsion angle L is reset. Once the maximum value of the torsion angle L is reset, the processing shown in FIG. 5 is newly started.

In the case of specifying the maximum value of the torsion angle L by the processing as described above, the control unit 14 needs to store only the maximum value of the torsion angle. Therefore, when the maximum value of the torsion angle is specified by such processing, it is possible to reduce the memory resources necessary for estimation of the shaft torque.

Here, the steps ST43 to ST45 performed by the maximum torsion angle value detection unit 143 and the step ST46 performed by the maximum torsion angle value reset unit 142 are actually the processing performed in parallel.

Method of Determining Extreme Value of Torsion Angle

As described above, the torque estimation device 1 according to the present embodiment determines the time point when the positive and negative inversion of the value of (torsion angle L—torsion angle H) occurs as the time point when the torsion angle L takes an extreme value. Hereinafter, the reasons why such processing can specify the time point when the torsion angle L takes an extreme value will be described in detail with reference to FIG. 7.

Figure 7:
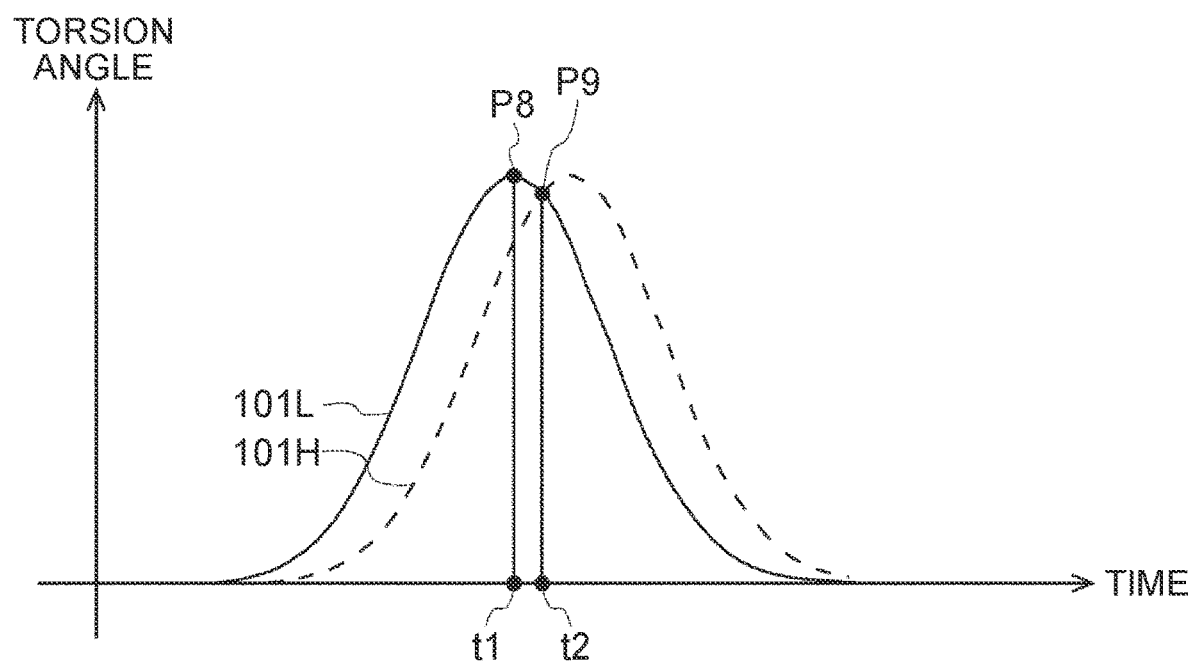
FIG. 7 is a graph illustrating the processing of detecting an extreme value of the torsion angle.

FIG. 7 is a graph illustrating the processing of detecting an extreme value of the torsion angle. FIG. 7 is a graph plotting the torsion angle value against time, in which a graph of a torsion angle 101L and a graph of a torsion angle 101H are superimposed. The torsion angle 101L and the torsion angle 101H are obtained by applying the lower LPF processing and the higher LPF processing to the torsion angle having an extreme value.

Here, a point P8 is the point where the torsion angle 101L takes an extreme value at time T1. A point P9 is the point where the torsion angle L and the torsion angle H intersect at time T2.

When LPF processing at different cutoff frequencies are applied to the torsion angle, increase and decrease of the value of the torsion angle that is subjected to the LPF processing at a higher cutoff frequency is delayed as compared with the increase and decrease of the value of the torsion angle subjected to the LPF processing at a lower cutoff frequency. Accordingly, as shown in the graphs of the torsion angle 101L and the torsion angle 101H shown in FIG. 7, the graph of the torsion angle 101H appears to be delayed with respect to the torsion angle 101L.

It can be said that applying the LPF processing at different cutoff frequencies generates a pseudo-time difference.

When the torsion angle 101L and the torsion angle 101H have extreme values, the magnitude relationship between the torsion angle 101L and the torsion angle 101H is changed with the time when the graph of the torsion angle 101L and the graph of the torsion angle 101H intersect, i.e., time T2, as a boundary as shown in FIG. 7.

In short, time T2 corresponds to the time point when positive and negative inversion of the value of (torsion angle L—torsion angle H) occurs.

Time T2 does not exactly coincide with time T1 at which the torsion angle L takes an extreme value. However, the difference between time T1 and time T2 can be reduced to an error range by adjusting the respective cutoff frequencies in the lower and higher LPF processing. Therefore, when the respective cutoff frequencies in the lower and higher LPF processing are appropriately set, the time point when the positive and negative inversion of the value of (torsion angle L—torsion angle H) occurs may be determined as the time point when the torsion angle L takes an extreme value.

Based on the above-described reasons, the torque estimation device 1 according to the present embodiment may determine the time point when the positive and negative inversion of the value of (torsion angle L—torsion angle H) occurs as the time point when the torsion angle L takes an extreme value. When such specification is made, the torque estimation device 1 according to the present embodiment does not need to store the values of the torsion angle in order to specify the extreme value of the torsion angle L. This makes it possible to reduce the memory resources.

As a method related to the method of specifying the extreme value of the torsion angle, a method of subtracting from a value of a torsion angle a value of the torsion angle before a prescribed time point and specifying the time point when positive and negative inversion of the obtained value occurs as the time point when the torsion angle takes an extreme value may be contemplated. However, in this method, the values of the torsion angle for at least a prescribed time needs to be stored, and therefore it is difficult to reduce the memory resources necessary for torque estimation.

By using the configuration described above, the torque estimation device 1 according to the present embodiment can reduce the memory resources necessary for estimation of the shaft torque.

The torque estimation method according to the present embodiment may be executed by a torque estimation program mounted on the torque estimation device 1.

When the program is read into the computer, the program may include a group of commands (or software codes) for causing the computer to perform one or more functions described in the embodiment. The program may be stored in a non-transitory computer-readable medium or a tangible storage medium. The computer-readable medium or tangible storage medium includes, by way of example and not limitation, random-access memory (RAM), read-only memory (ROM), flash memory, solid-state drive (SSD) or other memory technology, CD-ROM, digital versatile discs (DVD), Blu-ray (registered trademark) discs or other optical disc storage, magnetic cassettes, magnetic tapes, magnetic disk storage or other magnetic storage devices. The program may be transmitted on a transitory computer-readable medium or a communication medium. The transitory computer-readable medium or the communication medium includes, by way of example and not limitation, electrical, optical, acoustic, or other forms of propagation signals.

Although the present disclosure has been described based on the embodiment, it is to be understood that an applicable embodiment of the present disclosure is not limited to the configuration in the embodiment disclosed, and embraces all kinds of modifications, corrections and combinations that can be made by those skilled in the art without departing from the scope of the present disclosure as set forth by claims in the range of claims of the present application.

What is claimed is:

1. A torque estimation method of estimating a value of shaft torque of a rotary motion transmitting mechanism including an input shaft and an output shaft, the torque estimation method comprising:
a step of specifying a maximum value of a torsion angle between the input shaft and the output shaft from a time point when a measurement value of the torsion angle is zero to a time point when the value of the shaft torque is estimated; and
a step of estimating the value of the shaft torque based on the measurement value of the torsion angle at the time point when the value of the shaft torque is estimated and on the maximum value of the torsion angle, wherein in the step of specifying the maximum value of the torsion angle, the maximum value of the torsion angle is specified based on a difference between the measurement value of the torsion angle subjected to low-pass filter processing at a first cutoff frequency and the measurement value of the torsion angle subjected to low-pass filter processing at a second cutoff frequency.

2. The torque estimation method according to claim 1, wherein in the step of specifying the maximum value of the torsion angle,
the difference between the measurement value of the torsion angle subjected to the low-pass filter processing at the first cutoff frequency and the measurement value of the torsion angle subjected to the low-pass filter processing at the second cutoff frequency is calculated,
time points when positive and negative inversion of the difference in the torsion angle occurs are detected as time points when the torsion angle takes extreme values, and
among the detected extreme values of the torsion angle, the extreme value having a largest absolute value is specified as the maximum value of the torsion angle.

3. The torque estimation method according to claim 1, wherein in the step of specifying the value of the shaft torque,
a value of hysteresis of the shaft torque is estimated from the maximum value of the torsion angle, and
the value of the shaft torque is estimated based on the value of the hysteresis.

4. The torque estimation method according to claim 1, wherein in the step of estimating the value of the shaft torque, the value of the shaft torque is estimated when rotary motion is stopped.

5. The torque estimation method according to claim 1, wherein the torsion angle between the input shaft and the output shaft is detected by a first sensor attached to the input shaft and a second sensor attached to the output shaft.

6. A torque estimation device configured to estimate shaft torque of a rotary motion transmitting mechanism including an input shaft and an output shaft, the torque estimation device comprising:
a first sensor attached to the input shaft;
a second sensor attached to the output shaft;
first and second low-pass filters different in cutoff frequency; and
a control unit configured to estimate a value of the shaft torque, based on a measurement value of a torsion angle between the input shaft detected by the first sensor and the output shaft detected by the second sensor, wherein the control unit is configured to
specify a maximum value of the torsion angle between the input shaft and the output shaft from a time point when the measurement value of the torsion angle is zero to a time point when the value of the shaft torque is estimated based on a difference between the measurement value of the torsion angle subjected to low-pass filter processing at a first cutoff frequency and the measurement value of the torsion angle subjected to low-pass filter processing at a second cutoff frequency, and estimate the value of the shaft torque based on the measurement value of the torsion angle at the time point when the value of the shaft torque is estimated and on the maximum value of the torsion angle.

7. A torque estimation program causing a computer to execute processing to estimate shaft torque of a rotary motion transmitting mechanism including an input shaft and an output shaft, the torque estimation program comprising:
a step of specifying a maximum value of a torsion angle between the input shaft and the output shaft from a time point when a measurement value of the torsion angle is zero to a time point when the value of the axial torque is estimated; and
a step of estimating the value of the axial torque based on the measurement value of the torsion angle at the time point when the value of the axial torque is estimated and on the maximum value of the torsion angle, wherein in the step of specifying the maximum value of the torsion angle, the maximum value of the torsion angle is specified based on a difference between the measurement value of the torsion angle subjected to low-pass filter processing at a first cutoff frequency and the measurement value of the torsion angle subjected to low-pass filter processing at a second cutoff frequency.

* * * * *